(12) United States Patent
Kincaid et al.

(10) Patent No.: US 6,551,006 B2
(45) Date of Patent: *Apr. 22, 2003

(54) HYBRID BALL STUD

(75) Inventors: Jeffrey L. Kincaid, Clarkston, MI (US); Neil A. Wasylewski, Farmington Hills, MI (US); Brian A. Mattila, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/990,172

(22) Filed: Nov. 21, 2001

(65) Prior Publication Data

US 2002/0034414 A1 Mar. 21, 2002

Related U.S. Application Data

(62) Division of application No. 09/115,084, filed on Jul. 14, 1998.

(51) Int. Cl.[7] .................................................. F16C 11/06
(52) U.S. Cl. ........................ 403/130; 403/131; 411/396
(58) Field of Search .................. 403/122, 131, 403/128, 129, 130, 135; 411/396, 372.6, 372.5, 373

(56) References Cited

U.S. PATENT DOCUMENTS

| 2,934,365 A | * | 4/1960 | Moskovitz | 403/130 X |
| 3,091,486 A | * | 5/1963 | Baker | 403/131 X |
| 5,626,057 A | * | 5/1997 | Nishigai et al. | 403/130 X |
| 6,338,589 B1 | * | 1/2002 | Kincaid et al. | 403/131 X |

* cited by examiner

Primary Examiner—Lynne H. Browne
Assistant Examiner—John R. Cottingham
(74) Attorney, Agent, or Firm—Harness, Dickey & Pierce P.L.C.

(57) ABSTRACT

The present invention provides a ball joint for use in interconnecting a pair of components to accommodate relative angular movement therebetween. The ball joint includes a socket assembly and a hybrid ball stud. The socket assembly includes a cup-shaped housing defining a cavity therein and an insert disposed within the housing cavity and which defines a spherical ball socket. The hybrid ball stud includes a standard bolt and a polymeric insert attached to, or encapsulating, the head of the bolt to define a spherical ball or a partial spherical ball. The polymeric insert is adapted to be retained in the ball socket. The bolt is a high-volume commercially-available component having a threaded shank segment and a head segment which is over-molded or fitted with the polymeric insert. As such, an inexpensive hybrid ball stud is provided for use in ball joints.

11 Claims, 3 Drawing Sheets

HYBRID BALL STUD

BACKGROUND OF THE INVENTION

1. Technical Field

The present invention relates to ball joints and, more particularly, to a hybrid ball stud for a ball joint comprised of a bolt and a spherical polymeric component secured to the head of the bolt to define a ball segment of the ball stud.

2. Discussion

As is known, motor vehicles are equipped with suspension systems for absorbing road shock and other vibrations while providing a smooth and comfortable ride for the vehicle occupants. In virtually all vehicular suspension systems, ball joints are used to interconnect suspension components for accommodating changes in angularity therebetween. In general, most conventional ball joints include a ball stud, a ball socket, and a housing. Typically, the ball stud is a forged metallic component having an elongated shank segment and a ball segment. The shank segment of the ball stud is connected to one suspension component and the housing is fixed to the other suspension component. The ball segment of the ball stud is retained in a spherical cavity formed in the ball socket which, in turn, is mounted in the housing. To facilitate angular movement of the ball stud relative to the housing, the sphericity and surface profiles of the ball segment must be highly precise. These component characteristics have conventionally required the utilization of expensive and time-consuming secondary machining and finishing operations.

As an alternative to forged ball studs, it is known to provide a ball joint equipped with a ball stud having a polymeric layer molded over the ball segment. See, for instance, U.S. Pat. Nos. 2,862,740, 2,905,492 and 3,091,486. As a further alternative, some ball studs have a polymeric ball mounted to one end of a threaded stud. See, for example, U.S. Pat. Nos. 2,999,709, 3,023,038, 3,941,495 and 5,697,142. Finally, it is also known to surround a portion of a threaded stud with a partially spherical polymeric insert and which engages a radial flange extending from the stud. See, for example, U.S. Pat. No. 2,823,055, 2,846,252, 2,937,895, 2,953,401, 3,091,486, 4,334,795 and 4,629,352. In each case, a molded component is used as the ball segment to limit or eliminate the secondary surface finishing operations associated with conventional forged ball studs.

Although various composite assemblies have been proposed for constructing a ball stud to avoid the machining and heat treating requirements associated with forged ball studs, none have been successful in significantly reducing production costs. Therefore, it would be desirable to provide a ball joint having a composite ball stud requiring minimal labor and processing costs.

SUMMARY OF THE INVENTION

The present invention provides a ball joint for use in interconnecting a pair of components to accommodate relative angular movement therebetween. The ball joint includes a socket assembly and a hybrid ball stud. The socket assembly includes a cup-shaped housing defining a cavity therein and an insert disposed within the housing cavity and which defines a spherical ball socket. The hybrid ball stud includes a standard bolt and a polymeric insert attached to, or encapsulating, the head of the bolt to define a spherical ball or a partial spherical ball. The polymeric insert is adapted to be retained in the ball socket. The bolt is a high-volume commercially-available component having a threaded shank segment and a head segment which is over-molded or fitted with the polymeric insert. As such, an inexpensive hybrid ball stud is provided for use in ball joints.

As a further feature of the present invention, a partially spherical polymeric member may be molded on, or attached to, the shank segment of the bolt such that the polymeric member and the spherical head segment of the bolt combine to serve as the ball segment of the ball stud.

According to another feature of the present invention, a toroidal polymeric member is molded on, or attached to, the head of the bolt to serve as the ball segment of the ball stud.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

In general, the present invention is directed toward a ball joint for accommodating relative angular movement between a pair of suspension components such as, for example, a stabilizer bar and a control arm in a vehicle suspension. The ball and socket assembly of the present invention includes a hybrid ball stud adapted to replace most conventional ball studs and to work in conjunction with ball joints to provide reduced cost without impairing performance of the vehicle suspension. Thus, the ball joint of the present invention may be utilized with a wide variety of systems and is not intended to be limited to the particular application described herein.

Figure 1:
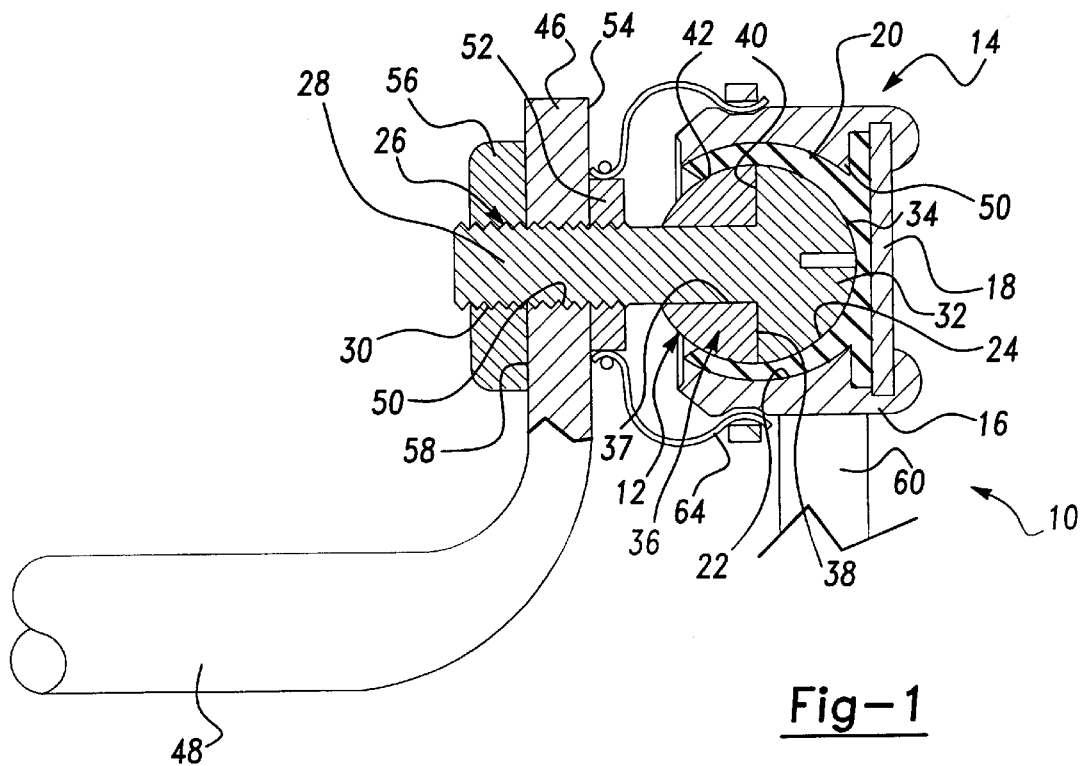
FIG. 1 is a sectional view of a ball and socket assembly equipped with a hybrid ball stud made in accordance with one preferred embodiment of the present invention.
Figure 2:
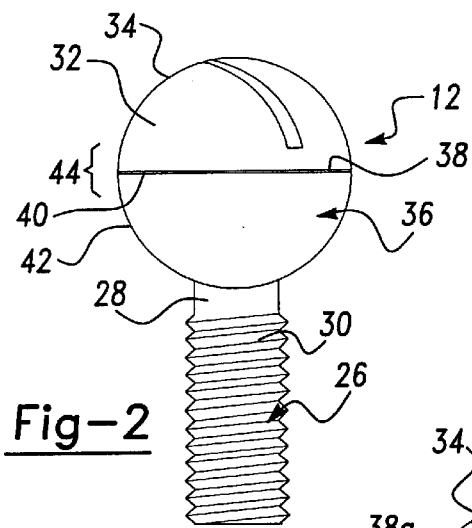
FIG. 2 is a side elevational view of the hybrid ball stud shown in FIG. 1.

Referring initially to FIG. 1, a ball and socket assembly, hereinafter referred to as ball joint 10, is shown to be of the type adapted to interconnect a pair of suspension members and accommodate relative angular motion therebetween. In general, ball joint 10 includes a hybrid ball stud 12 and a socket assembly 14. Socket assembly 14 is shown to include a housing 16, an end cap 18 enclosing one end of housing 16, and a polymeric liner 20 retained in an open-ended cavity 22 of housing 16. Liner 20 is formed to include a spherical socket 24.

Hybrid ball stud 12 includes a bolt 26 having a shank segment 28 on which external threads 30 are formed and a head segment 32. As will be detailed, bolt 26 is a standard "off-the-shelf" component commonly referred to as a round head bolt. As such, head segment 32 of bolt 26 is hemispherical and defines an outer surface 34 that is adapted to engage the inner wall surface of socket 24 in liner 20. Hybrid ball stud 12 is further shown to include a hemispherical component 36 that is made of a suitable polymeric material. Hemispherical component, hereinafter referred to as polymeric insert 36, has an aperture defining an inner surface 37 which surrounds a proximal end portion of shank segment 28 adjacent to head segment 32 such that its planar top surface 38 is juxtapositioned adjacent to a planar underside surface 40 of head segment 32. Polymeric insert 36 has an outer surface 42 adapted to engage the inner surface of socket 24 in liner 20. Preferably, the radius of polymeric insert 36 is identical to that of head segment 32 so as to cooperatively define a spherical ball 44 which is retained in socket 24 for angular movement relative to housing 16 and liner 20.

Referring again to FIG. 1, ball joint 10 is shown interconnecting two relatively movable components. In particular, an arm segment 46 of a stabilizer bar 48 is shown to have shank segment 28 of bolt 26 extending through a bore 50 formed therein. A nut 52 is threaded onto shank segment 28 and acts as a stop flange which is positioned against a planar face surface 54 of arm segment 46. With threaded shank segment 28 extending through bore 50, a lock nut 56 is tightened onto threads 30 and into engagement with an opposite planar face surface 58 of arm segment 46. Accordingly, bolt 26 of ball joint 10 is secured to stabilizer bar 48. In addition, housing 16 is fixed to a rod or link 60 which is suitably fixed to another suspension component or a frame component of the motor vehicle. If ball joint 10 is part of an end link, then a second ball joint is attached to the opposite end of link 60 and, in turn, its bolt is secured to a control arm. Those skilled in this art will appreciate that this particular arrangement is merely exemplary of but one of the many applications to which ball joint 10 can be employed.

Polymeric insert 36 can be molded insitu to surround the proximal end of shank segment 28 of bolt 26. In the alternative, insert 36 may be preformed and include a through bore that is slid over the distal end of shank segment 28 with surface 37 then being adhesively bonded to the proximal end of shank segment 28 and/or surface 38 being adhesively bonded to underside surface 40 of head segment 32. In either case, hybrid ball stud 12 is fabricated or assembled using a standard round-head bolt 26.

Figure 3:
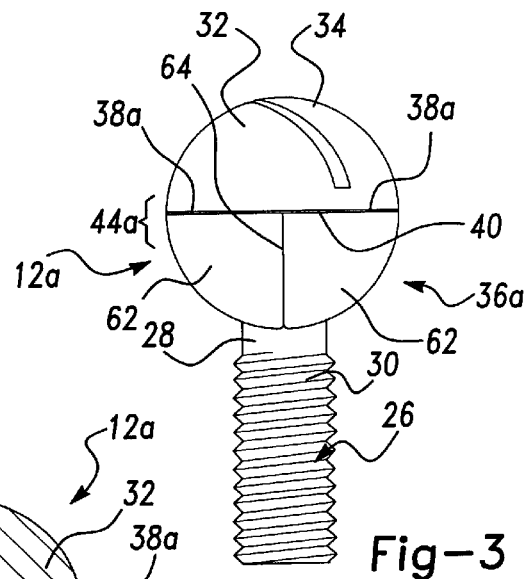
FIG. 3 is a side elevational view of a hybrid ball stud made in accordance with another embodiment of the present invention.
Figure 4:
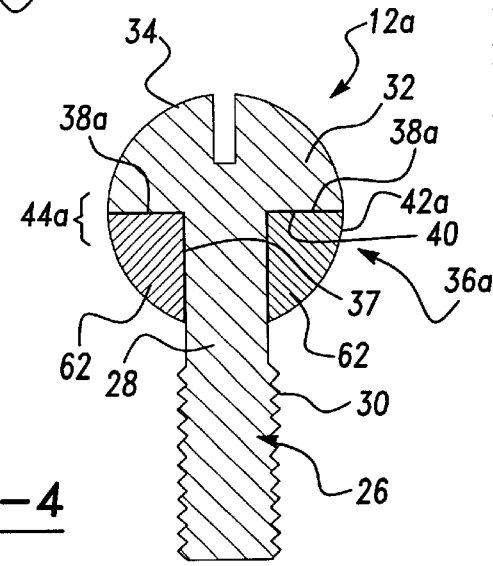
FIG. 4 is a sectional view of the hybrid ball stud of FIG. 3.

As a further alternative, FIGS. 3 and 4 illustrate a ball stud 12a adapted for use in ball joint 10 and having a segmented polymeric insert 36a mounted to round-head bolt 26. In particular, segmented polymeric insert 36a is identical to insert 36 except that is has been cut into sections 62. In this application, sections 62 are preformed and then adhesively bonded to one another along section lines 64, and/or bonded to bolt 26 along mating radial surfaces 38a and 40 as well as along the proximal portion of shank segment 28. Outer surface 42a of insert sections 62 are spherical such that insert 36a and head segment 32 define spherical ball 44a. Preferably, insert 36a consists of two quadrant sections 62, however any number of sections is contemplated.

Figure 5:
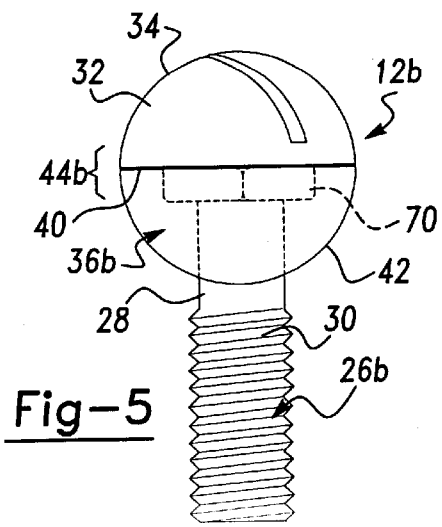
FIG. 5 is a side elevational view of a hybrid ball stud made in accordance with yet another embodiment of the present invention.
Figure 6:
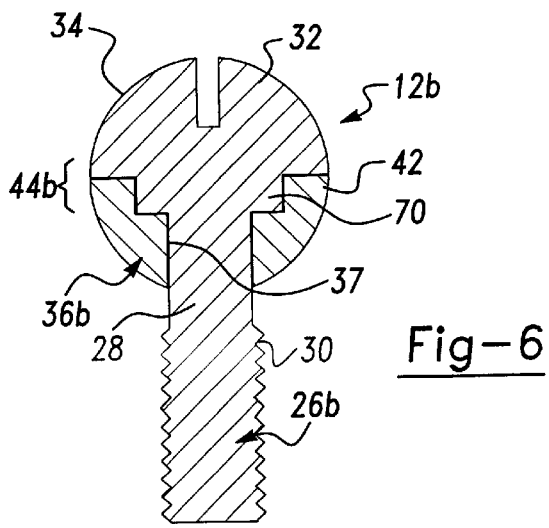
FIG. 6 is a sectional view of the ball stud of FIG. 5.

Referring now to FIGS. 5 and 6, a ball stud 12b for use in ball joint 10 is shown to have a polymeric ball insert 36b secured to a round-head square-neck bolt 26b. Bolt 26b is similar to bolt 26 except that shank segment 28 includes a four-sided neck flange 70 adjacent to underside surface 40 of round-head segment 32. Those components or features of ball stud 12b that are similar to those previously disclosed are identified by common reference numbers. Neck flange 70 serves as an anti-rotation feature which assists in preventing rotation of ball insert 36b relative to shank segment 28. As previously disclosed, insert 36b can be molded insitu or, in the alternative, be a preformed as a unitary component or as a series of sections which are adhesively secured to bolt 26b to cooperate with head segment 32 to define a spherical ball 44b. Again, a standard round-head square-neck bolt 26b is used to fabricate or assemble ball stud 12b. As a further option, any other standard bolt configurations having a non-square neck flange (i.e., hexagonal) can be substituted for bolt 26b.

Figure 7:
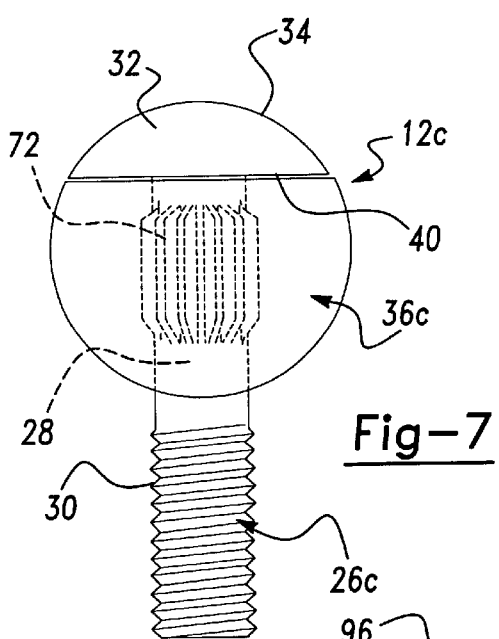
FIGS. 7 and 8 are side elevational views of additional alternative embodiments for the hybrid ball stud of the present invention.

Referring now to FIG. 7, a ball stud 12c for use in ball joint 10 is partially shown to include a polymeric insert 36c secured to a round-head bolt 26c having ribs or serrations 72 formed on the proximal end of shank segment 28 in adjacent to head segment 32. Serrations 72 assist in preventing rotation of insert 36c relative to head segment 32 of bolt 26c. Insert 36c can be molded insitu or can be preformed as a unitary component, or a series of preformed sections, adhesively bonded to mating surfaces on bolt 26c.

Figure 8:
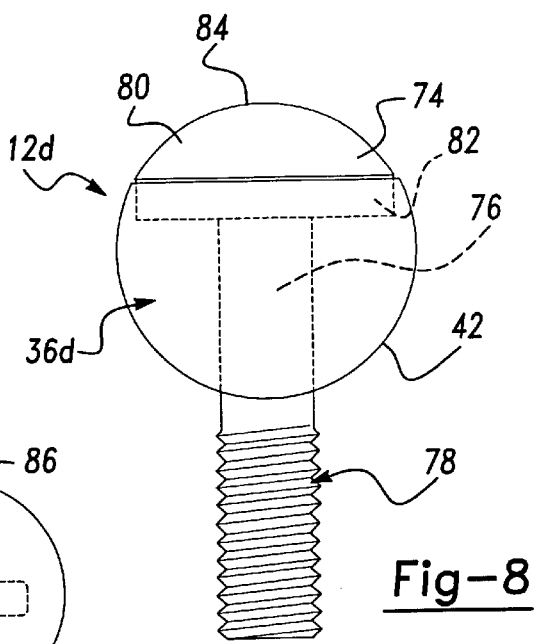

FIG. 8 partially illustrates a ball stud 12d for use in ball joint 10 including a polymeric insert 36d secured to a head segment 74 and a shank segment 76 of a T-head bolt 78. Head segment 74 has an arcuate portion 80 integrated with a rectangular hub 82. Insert 36d is formed such that the radius of its outer surface 42 matches and is contiguous with outer surface 84 of head segment 74.

Figure 9:
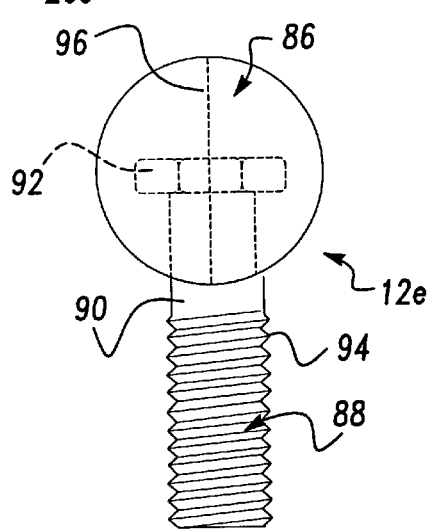
FIG. 9 is a side elevational view of another embodiment of the present invention.
Figure 10:
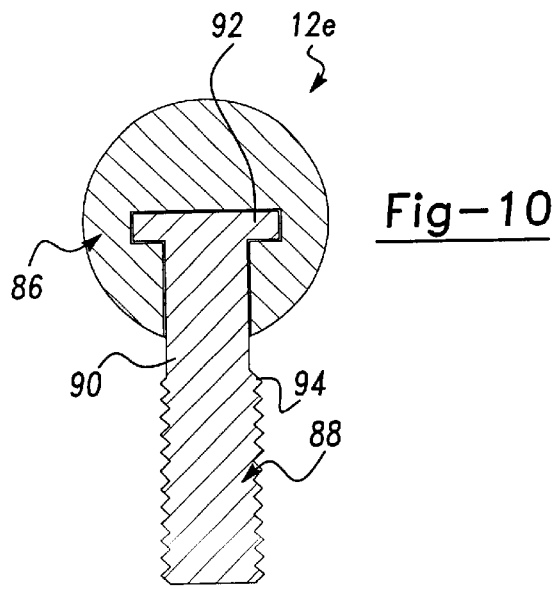
FIG. 10 is a sectional view of the hybrid ball stud shown in FIG. 9.

Referring now to FIGS. 9 and 10, a ball stud 12e for use in ball joint 10 is disclosed as having a polymeric insert 86 molded over an end portion of a standard hexagon head bolt 88. In particular, bolt 88 has a shank segment 90 and a hex-shaped head segment 92. Head segment 92 and a portion of shank segment 90 are encapsulated by insert 86. As is typical, shank segment 90 has external threads 94. As an alternative, insert 86 can be segmented into distinct section, such as optionally indicated by joint line 96 (in phantom), and adhesively bonded to bolt 88. Hex-shaped head segment 92 functions to prevent rotation of insert 86 relative to bolt 88. While polymeric insert 86 is shown to be spherical, it is to be understood that insert 86 can have any geometric shape provided with an outer surface adapted to matingly engage at least a portion of the ball joint socket for facilitating angular motion therebetween.

Figure 11:
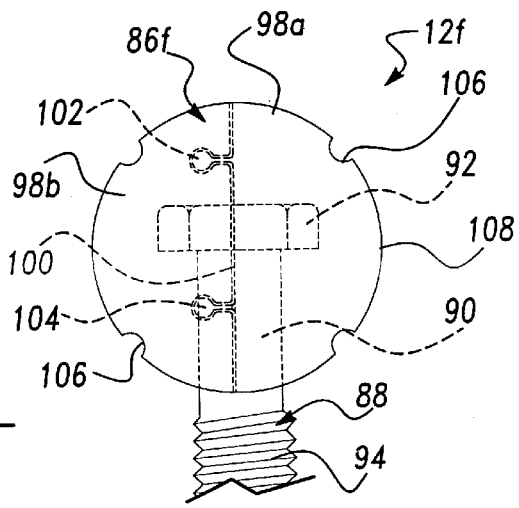
FIGS. 11 through 14 illustrates further alternative embodiments of the hybrid ball stud of the present invention.

FIG. 11 illustrates a ball stud 12f which is similar to ball joint 12e except that spherical polymeric insert 86f is segmented into sections 98a and 98b with a snap-lock type connection provided along joint line 100. In particular, sets of lugs 102 are formed on section 98a and are adapted for receipt in sockets 104 formed in section 98b to define spherical ball 86f. In addition, circular grooves 106 are formed in outer surface 108 of ball 86f, either transversely or parallel to shank segment 90 of bolt 88 to permit lubricating grease to be packed therein.

Figure 12:
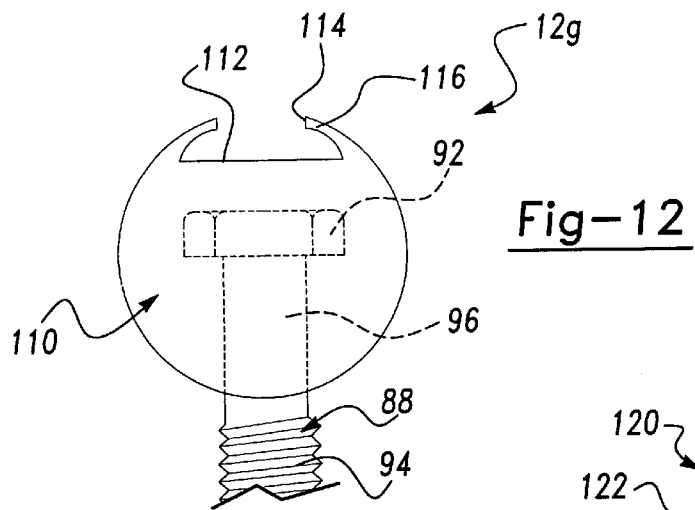

FIG. 12 illustrates a hybrid ball stud 12g which is generally similar to ball stud 12e of FIGS. 9 and 10 except that spherical polymeric insert 110 includes a recessed portion 112 defining an opening 114 and a circumferential cantilevered spring flange 116. This resilient spring flange arrangement functions to spring load ball stud 12g in socket 24 of ball joint 10.

Figure 13:
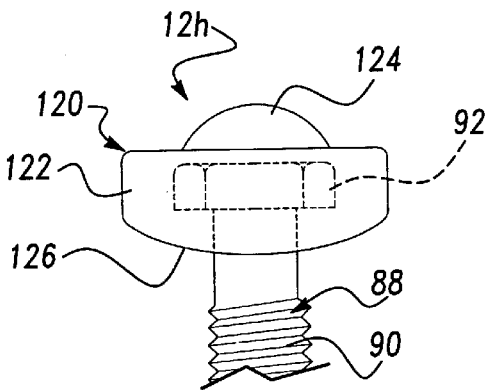

FIG. 13 illustrates another hybrid ball stud 12h having an insert 120 molded on, or affixed to, head segment 92 of hexagon bolt 88. Insert 120 includes a body portion 122 and a hemispherical nobbin portion 124. Nobbin is adapted for retention in a partially spherical spring seat formed in the ball socket while an outer surface 126 of body portion 122 is adapted to be retained in a modified socket 24 of liner 20.

Figure 14:
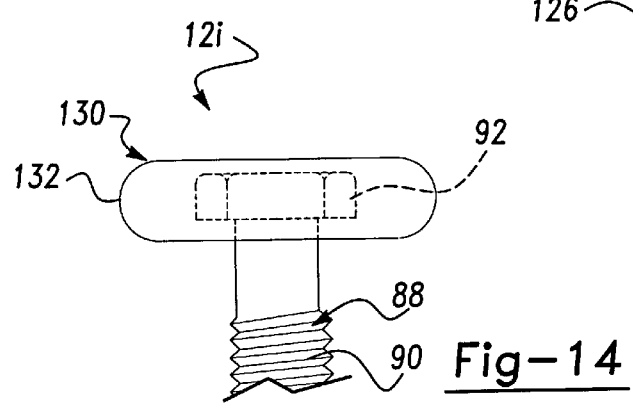

FIG. 14 illustrates another hybrid ball stud 12i having a toroidal polymeric insert 130 molded on, or affixed to, head segment 92 of hexagon bolt 88. Insert 130 is doughnut-shaped and has an outer surface 132 adapted to engage the inner surface of socket 24 in liner 20 of ball joint 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A ball joint comprising:

a socket assembly defining a spherical ball socket; and a hybrid ball stud including a bolt having a head segment and a shank segment, and a polymeric insert cooperating with said head segment to define a spherical ball retained in said ball socket, wherein said head segment and polymeric insert include surfaces engaging on inner surface of said ball socket and said bolt projecting through said insert such that said insert surrounds a portion of said shank segment adjacent said head segment.

2. A ball joint comprising:

a housing defining a cavity;

a liner retained in said cavity and defining a spherical ball socket; and a hybrid ball stud including a bolt having a head segment and a shank segment, said head segment is partially spherical to define an outer surface engaging an inner surface of said ball socket and a polymeric insert, said bolt extending through said polymeric insert, said polymeric insert being partially spherical to define an outer surface engaging said inner surface of said ball socket wherein said head segment and polymeric insert include surfaces engaging on inner surface of said ball socket.

3. A hybrid ball stud for use in a ball joint, comprising:

a bolt having a shank segment and a head segment; and an at least partially spherical polymeric insert cooperating with said head segment of said bolt for defining a ball segment, said partially spherical polymeric insert being continuous with said bolt head segment such that said head segment and polymeric insert are substantially continuous, wherein said polymeric insert, as well as said head segment, are adapted to engage an inner surface of a ball joint and said bolt projecting through said insert such that said insert surrounds a portion of said shank segment adjacent said head segment.

4. A suspension system for a motor vehicle comprising:

a first suspension member;

a second suspension member; and a ball joint interconnecting said first and second suspension members, said ball joint including a socket assembly fixed to said first suspension member and defining a spherical ball socket, said ball joint further including a hybrid ball stud comprised of a bolt having a head segment and a shank segment fixed to said second suspension member, and a polymeric insert cooperating with said head segment to define an at least partially spherical ball segment retained in said ball socket, wherein said head segment and polymeric insert include surfaces engaging on inner surface of said ball socket and said bolt extending through said insert such that said insert surrounds a portion of said shank segment adjacent said head segment.

5. The ball joint of claim 1 wherein said polymeric insert includes a plurality of insert segments surrounding a portion of said shank segment of said bolt to cooperatively define a spherical outer surface.

6. The ball joint of claim 1 wherein said polymeric insert is a ball and said bolt has a hex-shaped head segment encapsulated in said ball.

7. The ball joint of claim 2 wherein said polymeric insert is a plurality of insert segments surrounding a portion of said shank segment of said bolt to cooperatively define a spherical outer surface.

8. The ball stud of claim 3 wherein said insert is a plurality of complementary insert segments which cooperate to define said ball segment.

9. The ball stud of claim 3 wherein said insert is molded over said head segment of said bolt.

10. The suspension system of claim 6 wherein said polymeric insert includes a plurality of insert segments surrounding a portion of said shank segment of said bolt to cooperatively define a spherical outer surface.

11. The suspension system of claim 4 wherein said polymeric insert includes a pair of hemispherical sections interconnected to define said ball.

* * * * *